United States Patent
Imanishi et al.

(10) Patent No.: US 9,150,250 B2
(45) Date of Patent: Oct. 6, 2015

(54) SUB-FRAME FOR VEHICLE

(71) Applicants: HONDA MOTOR CO., LTD., Minato-Ku, Tokyo (JP); YANAGAWA SEIKI CO., LTD., Fuchu-Shi, Tokyo (JP)

(72) Inventors: Tomoyuki Imanishi, Wako (JP); Nobuyuki Okabe, Fuchu (JP)

(73) Assignees: Honda Motor Co., Ltd., Tokyo (JP); Yanagawa Seiki Co., Ltd., Tokyo (JP)

( * ) Notice: Subject to any disclaimer, the term of this patent is extended or adjusted under 35 U.S.C. 154(b) by 0 days.

(21) Appl. No.: 14/484,934

(22) Filed: Sep. 12, 2014

(65) Prior Publication Data

US 2015/0075896 A1 Mar. 19, 2015

(30) Foreign Application Priority Data

Sep. 13, 2013 (JP) .................................. 2013-190786

(51) Int. Cl.
*B62D 21/11* (2006.01)

(52) U.S. Cl.
CPC ............ *B62D 21/11* (2013.01); *B60G 2206/60* (2013.01)

(58) Field of Classification Search
CPC ...... B62D 21/155; B62D 21/11; B62D 21/00; B60G 2206/60; B60G 2206/0114; B60G 2204/15
USPC .................................................. 280/124.109
See application file for complete search history.

(56) References Cited

U.S. PATENT DOCUMENTS

| | | | |
|---|---|---|---|
| 5,879,026 A * | 3/1999 | Dostert et al. ................. | 280/781 |
| 8,740,231 B2 * | 6/2014 | Shibaya ................. | 280/124.109 |
| 2010/0231005 A1 * | 9/2010 | Yoshida et al. .......... | 296/203.02 |
| 2011/0012320 A1 * | 1/2011 | Kotagiri et al. .......... | 280/124.11 |
| 2011/0115258 A1 * | 5/2011 | Ohhama et al. .......... | 296/193.07 |

FOREIGN PATENT DOCUMENTS

| | | | |
|---|---|---|---|
| JP | 2012-136195 A | | 7/2012 |
| WO | WO 2014175414 A1 | * | 10/2014 |
| WO | WO 2014175416 A1 | * | 10/2014 |
| WO | WO 2014175431 A1 | * | 10/2014 |

* cited by examiner

*Primary Examiner* — Keith Frisby
(74) *Attorney, Agent, or Firm* — Carrier Blackman & Associates, P.C.; Joseph P. Carrier; William D. Blackman (57) ABSTRACT

A vehicle subframe includes a hollow body part and a loft suspension support part provided to a left end part of the body part. The left suspension support part has a left front connecting part, and the left front connecting part is opened downward ward and laterally outward, whereby a left suspension arm is connected from a laterally outward side. A parting line mark of the subframe is formed in a bottom end part of a front connecting wall, and is formed in a laterally outward side part of the front connecting wall so as to extend upward from the bottom end part along the laterally outward side part.

2 Claims, 10 Drawing Sheets

SUB-FRAME FOR VEHICLE

FIELD OF THE INVENTION

The present invention relates to a vehicle subframe in which a body part having a hollow part is cast and suspension support parts are provided to left and right end parts of the body part.

BACKGROUND OF THE INVENTION

In certain vehicles, a cast subframe is provided to the rear of a power plant (an engine/transmission unit) in the vehicle body and suspension arms are supported on left and right sides of the subframe. The subframe has a front wall sloping upward toward the rear of the vehicle body.

The suspension arms have a front connecting part connected to a leading-side part of the subframe, and a rear connecting part connected to a trailing-side part of the subframe. Consequently, loads inputted to the suspension arms are transferred to the leading-side part or the trailing-side part of the subframe via the front or rear connecting part of the suspension arms.

The loads transferred to the leading or trailing-side part of the subframe are transferred to the side parts of the subframe between the leading- and trailing-side parts (see JP-A 2012-136195, for example).

In the subframe of Patent Document 1, a front wall is formed sloping upward toward the rear of the vehicle body. Consequently, a join part ("parting line" below) of a casting mold (a fixed mold and a movable mold) used when the subframe is cast is positioned in a bottom part of the subframe. A crease mark (i.e. parting mark) of the parting line is formed in the bottom part of the side part of the subframe due to the parting line being positioned in the bottom part of the subframe. Due to the parting mark being formed in the bottom part of the subframe (the side parts), it is thought that stress concentrates in the parting mark when a load are transferred from the suspension arms to the side parts of the subframe.

Thus, the subframe needs to be made reliably strong, in which regard there is scope for improvement.

SUMMARY OF THE INVENTION

It is therefore an object of the present invention to provide a vehicle subframe allowing the strength of the subframe to be ensured.

According the present invention, there is provided a vehicle subframe comprising a body part having an interior hollow part due to being cast molded; and left and right suspension support parts integrally provided to left and right end parts of the body part; suspension arms being connected to the suspension support parts once the subframe has been attached to a vehicle body; wherein the body part has in a top part thereof a front top inclined part extending to the rear of the vehicle body sloping upward from a front end of the top part; the suspension support parts have front connecting parts provided to the laterally outward sides of the front top inclined part and opened downward and laterally outward, whereby the suspension arms are connected from the laterally outward sides; and a parting line mark formed when the subframe is cast: is formed in a front part of the front connecting parts, in a bottom end part of the front connecting parts; and is formed in the laterally outward side parts of the front connecting parts, so as to extend upward from the bottom end part along the laterally outward side parts.

The top part of the body part has a front top inclined part, and the front top inclined part is formed extending to the rear of the vehicle body sloping upward from a front end of the top part. The front connecting parts of the suspension support parts are opened downward and laterally outward. Furthermore, joining areas are formed in the laterally outward side parts of the front connecting parts, so as to extend upward along the laterally outward side parts from the bottom end parts.

The front connecting parts are opened downward and laterally outward, and the suspension arms are connected to the front connecting parts from the laterally outward sides. Furthermore, loads inputted to the front connecting parts from the suspension arms are transmitted to the rear of the vehicle body through the sides of the body part. Consequently, the joining areas can be formed away from the directions in which the load is transmitted by extending the joining areas upward from the bottom end parts of the front connecting parts. The concentration of stress in the joining areas due to the inputted loads can thereby be minimized when loads are inputted from the suspension arms to the front connecting parts, and the strength of the subframe can be ensured.

Preferably, attachment parts attached to the vehicle are provided to the rear of the front connecting parts in the vehicle body, and a bottom part of the body part is formed so as to gradually rise from the front connecting parts toward the attachment parts. The inputted loads can thereby be satisfactorily transferred through the bottom part of the body part to the attachment parts when loads are inputted from the suspension arms to the front connecting parts, and the loads transferred to the attachment parts can be suitably borne by the vehicle body.

BRIEF DESCRIPTION OF THE ACCOMPANYING DRAWINGS

Preferred embodiments of the present invention will be described in detail below, by way of example only, with reference to the accompanying drawings, in which.

DETAILED DESCRIPTION OF THE INVENTION

The terms "front (Fr)," "rear (Rr)," "left (L)," and "right (R)" in the drawings refer to directions relative to the viewpoint of the driver.

Figure 1:
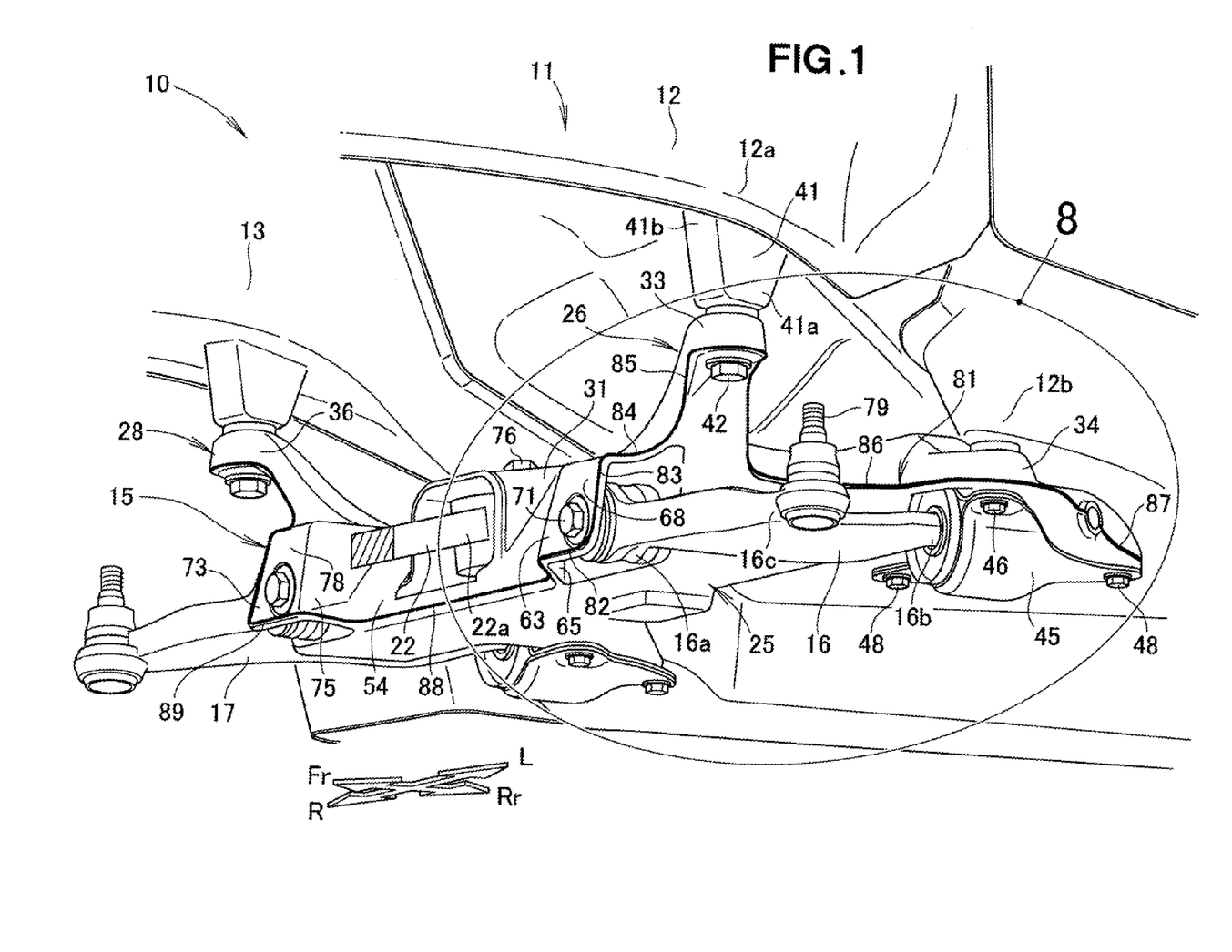
FIG. 1 is a perspective view of a vehicle body front structure including the subframe according to the present invention, as seen obliquely from the front and below.
Figure 2:
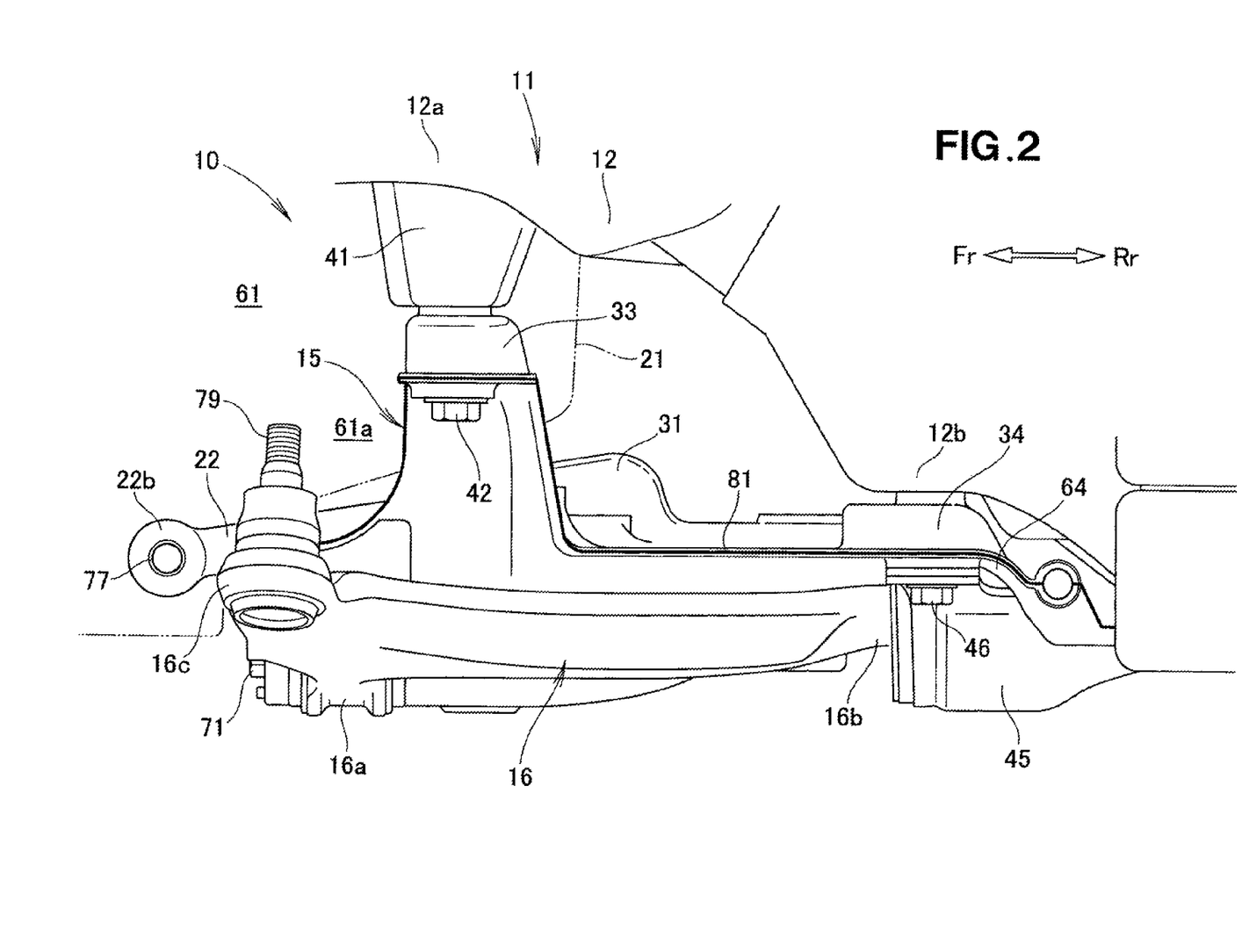
FIG. 2 is a side view of the vehicle body front structure of FIG. 1.

As shown in FIGS. 1 and 2, a vehicle body front structure 10 includes left and right side frames 12, 13 disposed longitudinally with respect to the vehicle body, a subframe attached below the left and right side frames 12, 13 (the subframe of the vehicle) 15, left and right suspension arms 16, 17 provided to the left and right ends of the subframe 15 (the suspension arms), and left and right front wheels 18, 19 (see FIG. 6) connected to the left and right suspension arms 16, 17.

The vehicle body front structure 10 further includes a power plant 21 provided in front of the subframe 15 in the vehicle body, and a torque rod 22 for connecting the power plant 21 to the subframe 15.

The vehicle body front structure 10 and the subframe 15 are substantially bilaterally symmetric, the left-side members and left-side areas being described below while detailed descriptions of the right side are omitted.

The left and right side frames 12, 13 are members forming part of the front framework of the vehicle body 11.

One example of the power plant 21 is an engine/transmission unit in which the engine and the transmission are formed integrally and disposed laterally between the left and right side frames 12, 13.

The left-side part of the power plant 21 is attached to the left side frame 12 via a left attachment bracket, and the right-side part of the power plant 21 is attached to the right side frame 13 via a right attachment bracket.

Figure 3:
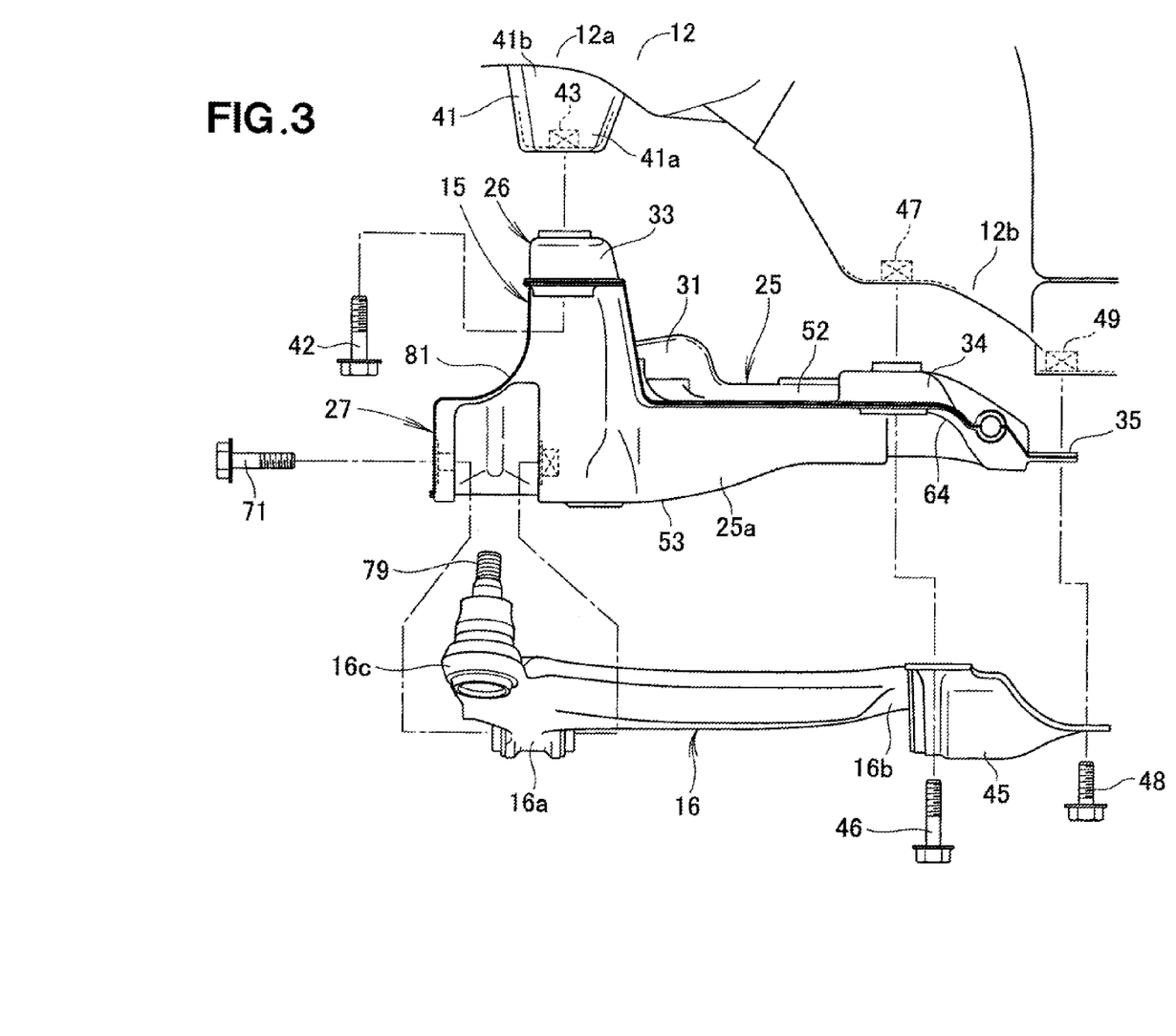
FIG. 3 is an exploded side view of the vehicle body front structure of FIG. 2.
Figure 4:
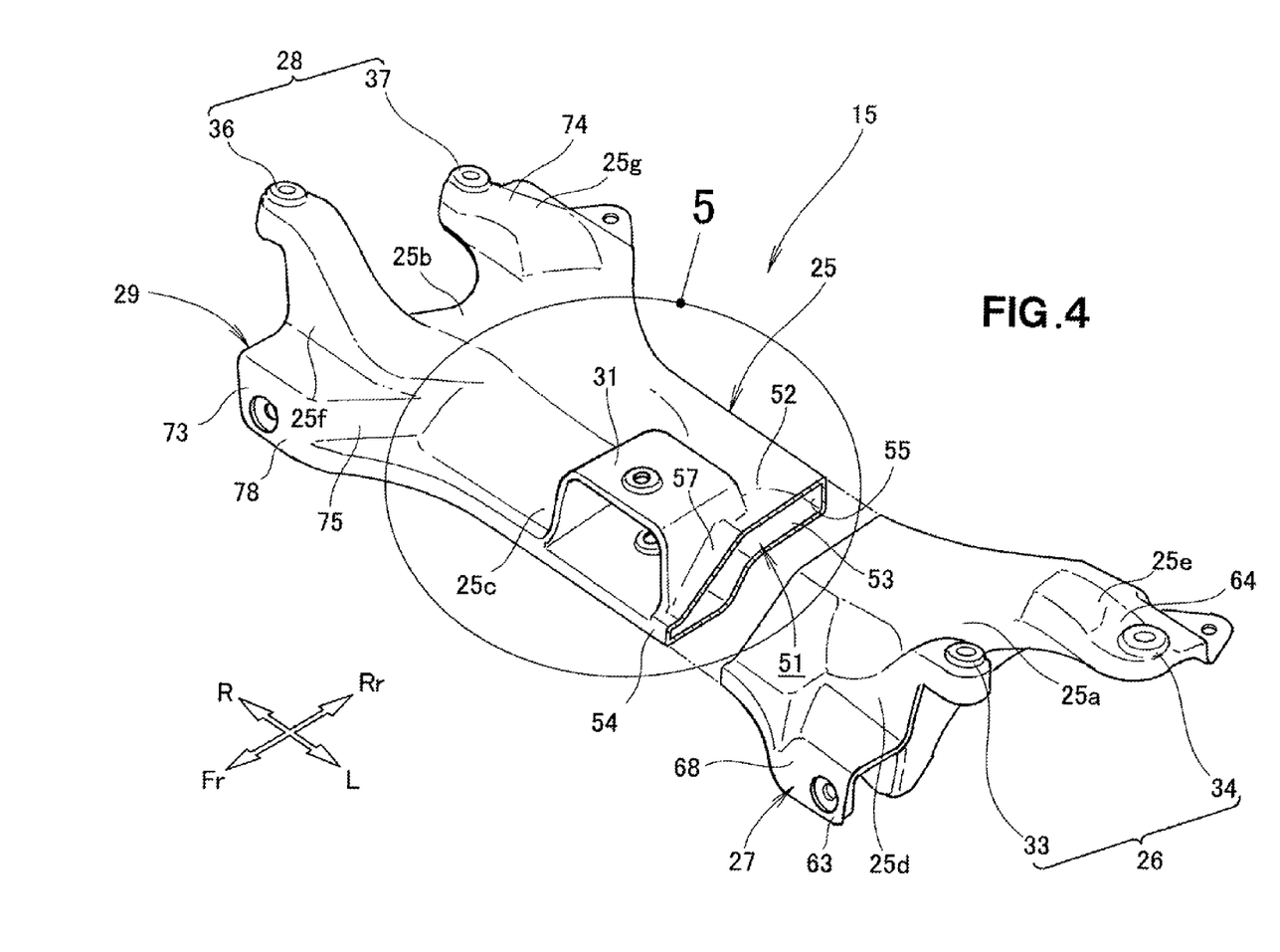
FIG. 4 is a perspective view of the subframe according to the present invention.

As shown in FIGS. 3 and 4, one example of the subframe 15 is a member made of an aluminum alloy, a core being used to form the subframe into a hollow configuration when the subframe is integrally cast under high pressure in the casting molds.

The subframe 15 includes a body part 25 formed into a hollow configuration using a core, a left vehicle body attachment part 26 and left suspension support part (a suspension support part) 27 provided to a left end part (a left-side part) 25a of the body part 25, a right vehicle body attachment part 28 and right suspension support part (suspension support part) 29 provided to a right end part (a right-side part) 25b of the body part 25, and a middle connecting part 31 provided to a front middle part 25c of the body part 25. The left vehicle body attachment part 26 includes a left front attachment part 33 integrally provided to a front part 25d of the left end part 25a of the body part 25, and a left rear attachment part (an attachment part) 34 integrally provided to a rear part 25e of the left end part 25a of the body part 25.

The right vehicle body attachment part 28, similar to the left vehicle body attachment part 26, includes a right front attachment part 36 integrally provided to a front part 25f of the right end part 25b of the body part 25, and a right rear attachment part (an attachment part) 37 integrally provided to a rear part 25g of the right end part 25b of the body part 25.

As shown in FIGS. 1 and 3, the left front attachment part 33 is attached by a bolt 42 and a nut 43 to a bottom end part 41a of a left front leg part 41. A top end part 41b of the left front leg part 41 is attached to a front frame attachment area 12a of the left side frame 12.

The left rear attachment part 34, along with a left rear attachment cover 45, is attached by a bolt 46 and nut 47 to a rear frame attachment area 12b of the left side frame 12.

The right vehicle body attachment part 28, similar to the left front attachment part 33 and the left rear attachment part 34, includes the right front attachment part 36 and the right rear attachment part 37 attached to the right side frame 13.

Thus, the left front attachment part 33 and the left rear attachment part 34 are attached to the left side frame 12, and the right front attachment part 36 and the right rear attachment part 37 are attached to the right side frame 13. The subframe 15 is thereby attached to the left and right side frames 12, 13.

Figure 5:
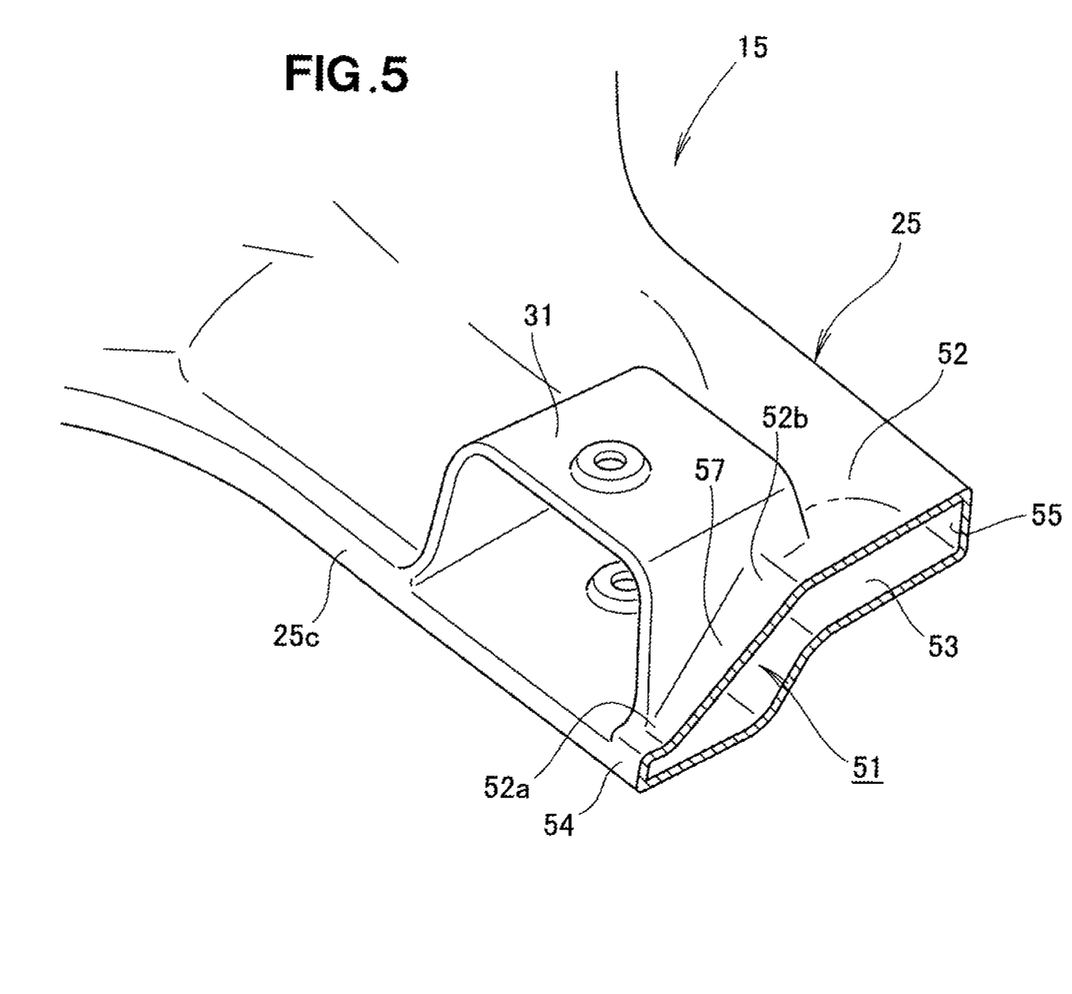
FIG. 5 is an enlarged view of section 5 in FIG. 4.

As shown in FIG. 5, when the body part 25 is integrally cast under high pressure in a casting mold, a core is used to form a hollow part 51 in the interior, and the hollow part is extended laterally.

The body part 25 has a top part 52 facing upward, a bottom part 53 facing downward, a front wall 54 connecting the front end parts of the top part 52 and the bottom part 53, and a rear wall 55 connecting the rear end parts of the top part 52 and the bottom part 53.

The hollow part 51 is formed in the body part 25 by the top part 52, the bottom part 53, the front wall 54, and the rear wall 55.

The top part 52 has a front top inclined part 57 between a front end 52a and a middle 52b (i.e. the front part of the top part 52). The front top inclined part 57 is an area that extends to the rear of the vehicle body sloping upward from the front end 52a of the top part 52 to the middle 52b.

The amount by which the subframe 15 bulges forward and upward can be kept to a minimum by forming the front top inclined part 57 in the front part of the top part 52.

Consequently, as shown in FIG. 2, it is possible to ensure there is a large front top space 61a for the subframe 15 in an engine compartment 61, and the power plant 21 can be housed within the engine compartment 61.

Furthermore, the front top inclined part 57 can be used as a draft angle by virtue of the top part 52 having the front top inclined part 57. Specifically, when the subframe 15 is cast under high pressure in a casting mold, the subframe 15 in the casting mold (cavity) can be easily taken out of the casting molds by using the front top inclined part 57 as a draft angle.

Figure 6:
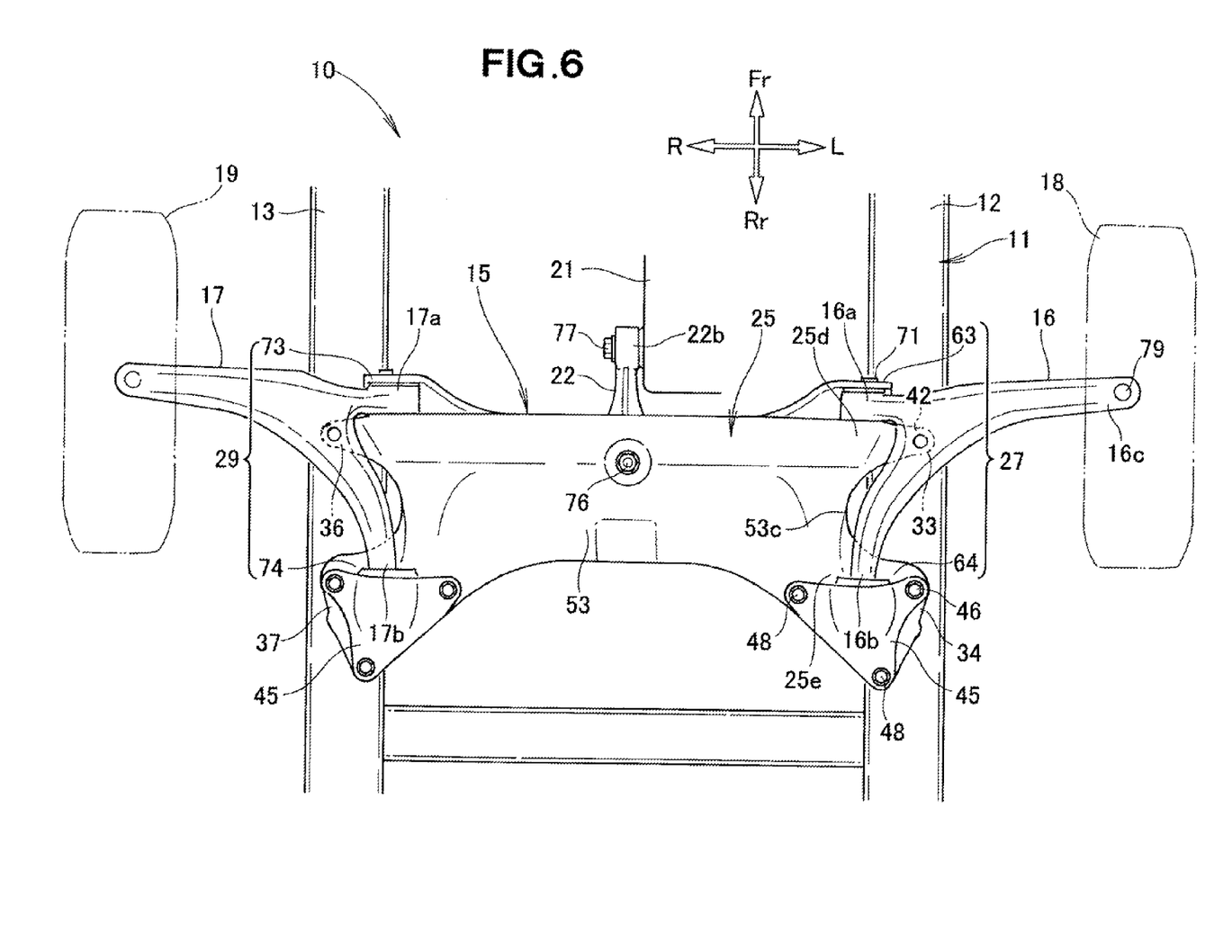
FIG. 6 is a bottom view of the vehicle body front structure of FIG. 1.

As shown in FIGS. 4 and 6, the left suspension support section 27 includes a left front connecting part (a front connecting part) 63 integrally provided to the front part 25d in the left end part 25a of the body part 25, and a left rear connecting part 64 integrally provided to the rear part 25e in the left end part 25a of the body part 25.

The left front connecting part 63 is provided so as to jut out toward the front of the vehicle body from the front part 25d, and is thereby provided farther toward the front of the vehicle body than the left front attachment part 33 and farther laterally outward to the left (laterally outward) than the front top inclined part 57.

Figure 7:
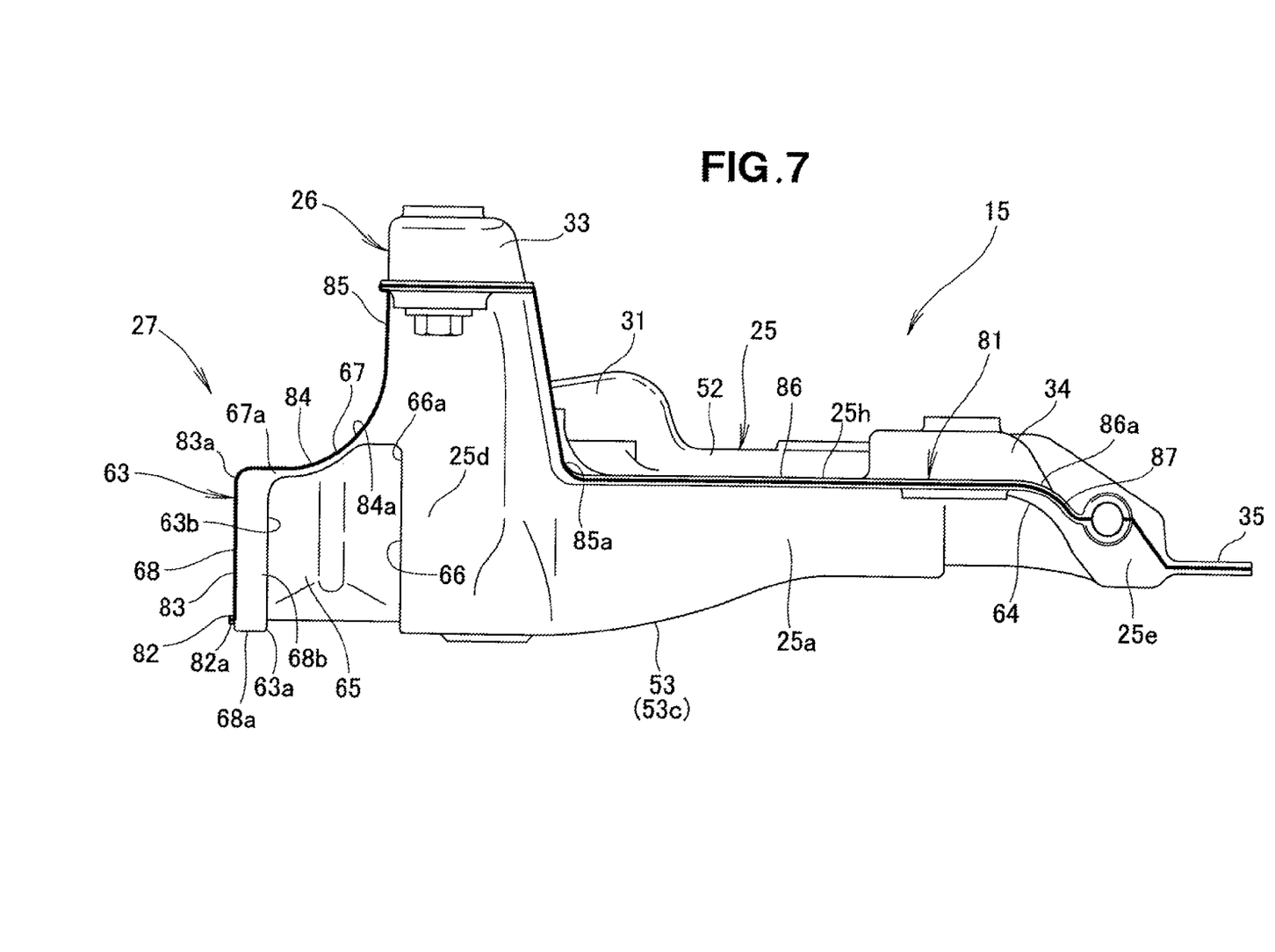
FIG. 7 is a side view of the subframe of FIG. 3.
Figure 8:
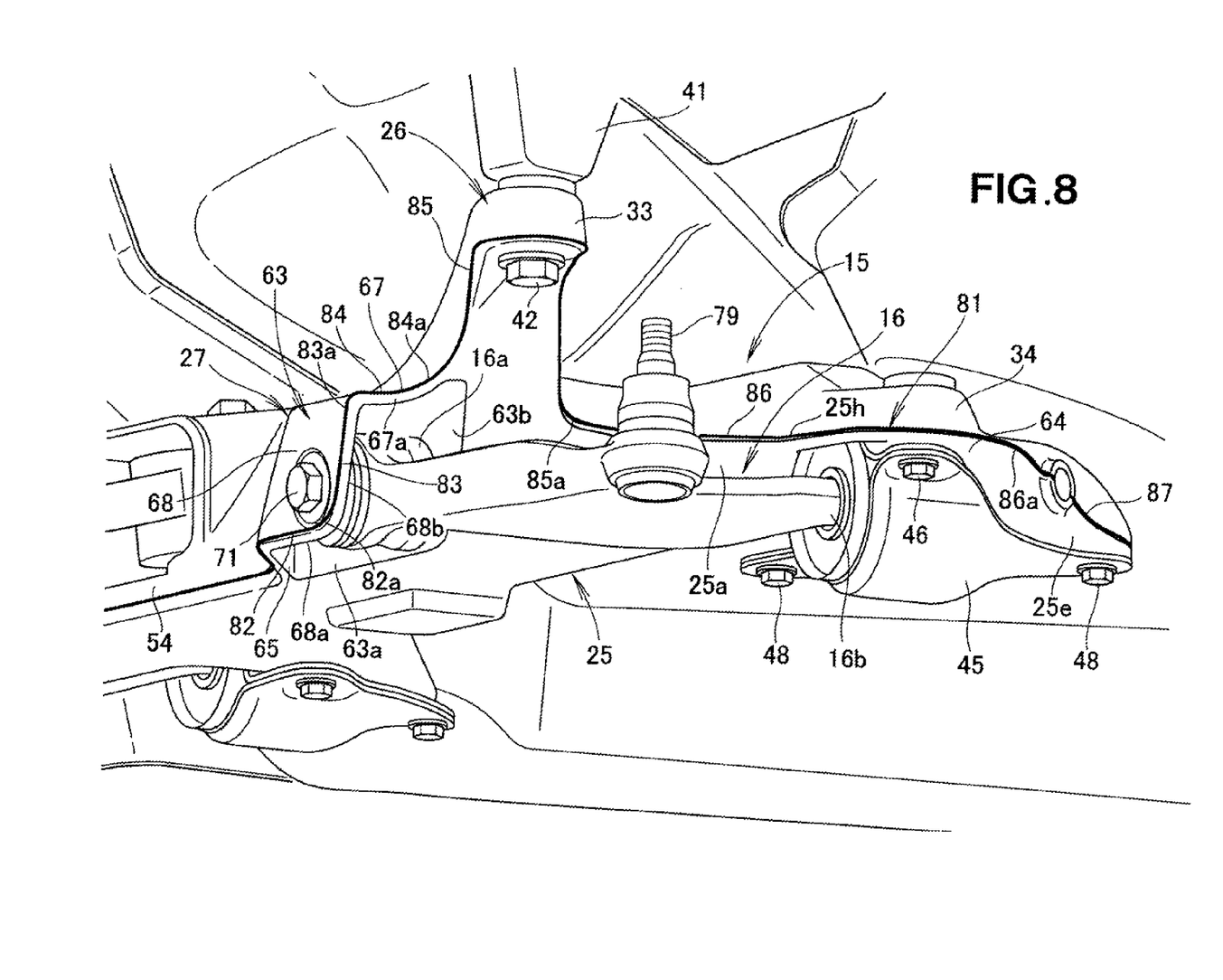
FIG. 8 is an enlarged view of section 8 in FIG. 1.

As shown in FIGS. 7 and 8, the left front connecting part 63, which is closed off on the laterally inward side by an inner connecting wall 65, has a rear connecting wall 66 formed by the front part 25d of the body part 25 (a left end part 25a), a top connecting part 67 jutting out toward the front of the vehicle body from a top end 66a of the rear connecting wall 66, and a front connecting wall (a front part of the front connecting part) 68 jutting out downward from a front end 67a of the top connecting part 67.

The front connecting wall 68 of the left front connecting part 63 is provided farther toward the front of the vehicle body than the left front attachment part 33 (the left vehicle body attachment part 26) and farther toward the front of the vehicle body than the front wall 54 of the subframe 15 (the body part 25).

Due to the left front connecting part 63 being formed by the rear connecting wall 66, the top connecting part 67, and the front connecting wall 68, a bottom opening 63a is opened facing downward in the left front connecting part 63, and a laterally outward side part opening 63b is opened facing laterally outward in the left front connecting part 63.

A front attachment part 16a of the left suspension arm 16 is inserted into the left front connecting part 63 from the laterally outward side, and the front attachment part 16a is connected to the left front connecting part 63 via a left front support bolt 71.

The left front attachment part 33 is provided above the left front connecting part 63, adjacent to and rearward from the left front connecting part 63 in the vehicle body. The left rear attachment part 34 is provided to the rear of the vehicle body relative to the left front attachment part 33, across a gap. Specifically, the left rear attachment part 34 is provided to the rear of the vehicle body relative to the left front connecting part 63, across a gap.

Returning to FIGS. 2 and 3, the left rear connecting part 64 is provided in proximity to the left rear attachment part 34. A rear attachment part 16b of the left suspension arm 16 is located between the left rear connecting part 64 and the left rear attachment cover 45, and the left rear attachment cover 45 is attached to the left rear connecting part 64 by bolts 46, 48. The rear attachment part 16b of the left suspension arm 16 is thereby connected to the left rear connecting part 64.

The left rear attachment cover 45, together with the left rear attachment part 34, is attached to the rear frame attachment area 12b of the left side frame 12 by the bolt 46 and the nut 47. Furthermore, the left rear attachment cover 45, together with a left rear securing part 35, is attached to the rear frame attachment area 12b of the left side frame 12 by a bolt 48 and a nut 49.

As shown in FIG. 6, the front attachment part 16a of the left suspension arm 16 is connected to the left front connecting part 63, and the rear attachment part 16b of the left suspension arm 16 is connected to the left rear connecting part 64. The left suspension arm 16 is thereby connected to the left suspension support section 27.

The bottom end part of the left suspension (not shown) is connected to the left suspension arm 16, and the top end part of the left suspension is connected to the vehicle body 11.

Consequently, the left suspension is supported on the left suspension arm 16. The left suspension is supported on the left suspension support section 27 via the left suspension arm 16.

Furthermore, a knuckle is attached to a distal end part 16c of the left suspension arm 16 via a knuckle bolt 79, and the left front wheel 18 is supported on the knuckle.

Returning to FIGS. 1 and 4, the right suspension support part 29, similar to the left suspension support part 27, includes a right front connecting part (a front connecting part) 73 integrally provided to the front part 25f in the right end part 25b of the body part 25, and a right rear connecting part 74 integrally provided to the rear part 25g in the right end part 25b of the body part 25.

The right front connecting part 73, similar to the left front connecting part 63, is closed off on the laterally inward side by the an inner connecting wall 75, and the right front connecting part has a front connecting wall (a front part of the front connecting part) 78.

The front connecting wall 78 of the right front connecting part 73, similar to the front connecting wall 68 of the left front connecting part 63, is provided farther toward the front of the vehicle body than the right front attachment part 36 (the right vehicle body attachment part 28) and farther toward the front of the vehicle body than the front wall 54 of the subframe 15 (the body part 25).

Returning to FIG. 6, in the right suspension support part 29, similar to the left suspension support part 27, a front attachment part 17a of the right suspension arm 17 is connected to the right front connecting part 73, and a rear attachment part 17b of the right suspension arm 17 is connected to the right rear connecting part 74.

The right suspension arm 17 is thereby connected to the right suspension support part 29. As shown in FIGS. 2 and 4, the middle connecting part 31 is provided to the longitudinal front part of the vehicle body, in the lateral middle of the body part 25. A proximal end part 22a of the torque rod 22 is connected to the middle connecting part 31 by a bolt 76 (see FIG. 1). A distal end part 22b of the torque rod 22 is connected to the power plant 21 by a bolt 77. The power plant 21 is thereby supported by the torque rod 22.

The front top inclined part 57 is formed in the top part 52 of the subframe 15 (specifically, the body part 25), and the amount by which the subframe 15 bulges forward and upward is kept to a minimum.

Consequently, as shown in FIG. 2, the rear part of the power plant 21 can be housed within the front top space 61a of the subframe 15 in the engine compartment 61.

As shown in FIGS. 7 and 8, the subframe 15 is molded using casting molds by high-pressure casting from an aluminum alloy. When the subframe 15 is molded by high-pressure casting, the casting molds are joined at a parting line by clamping the casting molds (a fixed mold and a movable mold).

Due to the parting line being formed in the casting molds, parting line marks (joining marks) 81 are formed in the subframe 15 when the subframe 15 is molded with the casting molds.

The parting line 81 has a first joining mark 82 formed in the front connecting wall 68, a second joining mark 83 connected to an outer end 82a of the first joining mark 82, a third joining mark 84 connected to a top end 83a of the second joining mark 83, a fourth joining mark 85 connected to a rear end 84a of the third joining mark 84, a fifth joining mark 86 connected to a rear end 85a of the fourth joining mark 85, and a sixth joining mark 87 connected to a rear end 86a of the fifth joining mark 86.

The parting line 81 further has a seventh joining mark 88 formed in the bottom end parts of the body part 25 (the front wall 54) and the left and right inner connecting walls 65, 75, as shown in FIG. 1.

Returning to FIGS. 7 and 8, the first joining mark 82 is formed in the front connecting wall 68, substantially horizontally along a bottom end part 68a of the front connecting wall 68. The second joining mark 83 is connected to the outer end 82a of the first joining mark 82, and is formed in a laterally outward side part 68b of the front connecting wall 68 so as to extend upward from the bottom end part 68a along the laterally outward side part 68b.

The third joining mark 84 is connected to the top end 83a of the second joining mark 83, and is formed in a laterally outward side part 67a of the top connecting part 67 so as to extend to the rear of the vehicle body from the outlet 67b, substantially horizontally along the laterally outward side part 67a. The fourth joining mark 85 is connected to the rear end 84a of the third joining mark 84, and is formed into an upward convex shape along the left front attachment part 33.

The bottom opening 63a of the left front connecting part 63 is opened downward, and the laterally outward side part 63b of the left front connecting part 63 is opened laterally outward. Furthermore, the front attachment part 16a of the left suspension arm 16 is inserted into the left front connecting part 63 from the laterally outward side, and the front attachment part 16a is connected to the left front connecting part 63 via the left front support bolt 71 (see FIG. 1).

Consequently, the first through fourth joining marks 82 to 85 are formed away from the front attachment part 16a of the left suspension arm 16. The first through fourth joining marks 82 to 85 are thereby formed in positions away from the load inputted from the front attachment part 16a of the left suspension arm 16.

The fifth joining mark 86 is connected to the rear end 85a of the fourth joining mark 85, and is formed so as to extend substantially horizontally along a top end 25h in the left end part 25a of the body part 25, to the rear of the vehicle body to the left rear attachment part 34. The sixth joining mark 87 is connected to the rear end 86a of the fifth joining mark 86, and is formed so as to extend along the rear part 25e of the body part 25 (the left end part 25a) to the rear end of the rear part 25e.

Furthermore, the subframe 15 is formed into a curved shape so that the bottom part 53 (see FIG. 6 as well) of the body part 25 slowly and continuously rises from the left front connecting part 63 toward the left rear attachment part 34.

Consequently, when a load is inputted from the front attachment part 16a of the left suspension arm 16 to the left front connecting part 63, the inputted load can be efficiently transferred to the left rear attachment part 34 through a left side part 53c of the body part 25 (the bottom part 53).

As shown in FIG. 1, the seventh joining mark 88 has a left end part that communicates with the first joining mark 82, and a right end part that communicates with an eighth joining mark 89. The eighth joining mark 89 is formed in the front connecting wall 78 (the bottom end part), similar to the first joining mark 82.

Specifically, the parting line 81 is formed so that the left vehicle body attachment part 26 (the left front attachment part 33, the left rear attachment part 34) and the right vehicle body attachment part 28 (the right front attachment part 36, the right rear attachment part 37 (see FIG. 4)) are connected by the seventh joining mark 88.

The parting line 81 is formed into a rib shape protruding from different areas, whereby the parting line 81 can also be used as a reinforcing part.

Consequently, the body part 25 (the front wall 54), the left vehicle body attachment part 26, and the right vehicle body attachment part 28 are reinforced by the parting line 81. The load inputted to the subframe 15 can thereby be suitably borne by the body part 25 (the front wall 54), the left vehicle body attachment part 26, and the right vehicle body attachment part 28.

Figure 9:
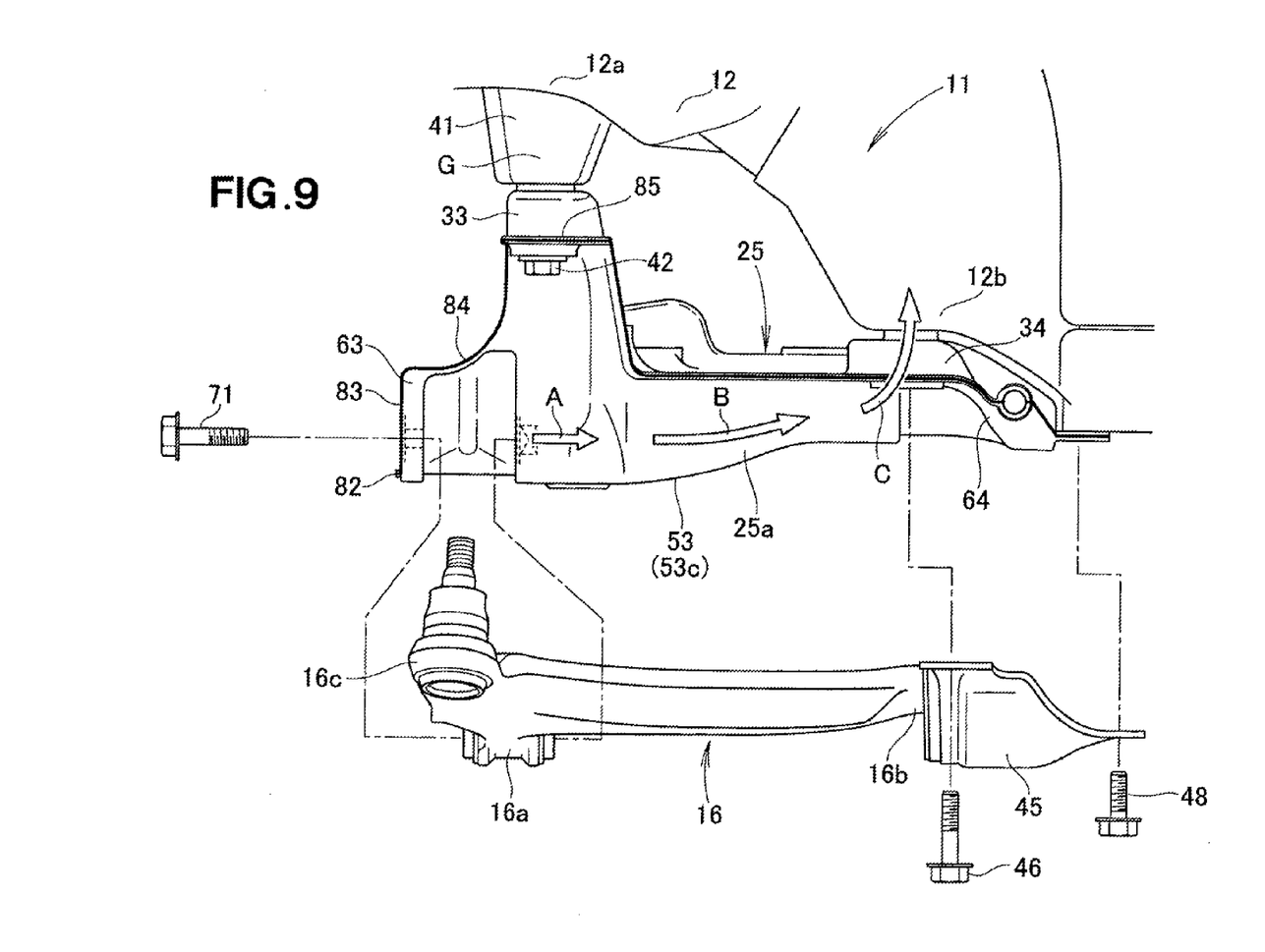
FIG. 9 illustrates an example in which a load is transmitted to the rear of the vehicle body from a front attachment part of the left suspension arm to the subframe of the present invention.

Next is a description, based on FIG. 9, of an example in which a load F1 is transferred from the front attachment part 16a of the left suspension arm 16 to the left end part 25a of the body part 25.

As shown in FIG. 9, a load is inputted to the left suspension arm 16 from the distal end part 16c of the left suspension arm 16. Part of the load inputted to the left suspension arm 16 is transferred through the front attachment part 16a and the left front support bolt 71 to the left front connecting part 63 of the subframe 15 as a load F1, as indicated by the arrow A.

The load F1 transferred to the left front connecting part 63 is transferred to the rear of the vehicle body to the body part 25 (specifically, the left end part 25a) of the subframe 15, as indicated by the arrow B. The load F1 transferred to the left end part 25a is transferred to the left rear attachment part 34.

The load F1 transferred to the left rear attachment part 34 is transferred through the left rear attachment part 34 and the bolt 46 to the rear frame attachment area 12b of the left side frame 12, as indicated by the arrow C. The load F1 transferred to the rear frame attachment area 12b is suitably borne by the left side frame 12 (i.e. the vehicle body 11).

Due to the load F1 being transferred as indicated by the arrows A to C, the first joining mark 82, the second joining mark 83, the third joining mark 84, and the fourth joining mark 85 can be formed away from the direction in which the load F1 is transmitted.

The concentration of stress in the first through fourth joining marks 82 to 85 due to the inputted load F1 can thereby be minimized when the load F1 is inputted from the left suspension arm 16 to the left front connecting part 63, and the strength of the subframe 15 can be ensured.

The subframe 15 is also formed into a substantially curved shape so that the bottom part 53 of the body part 25 gradually rises from the left front connecting part 63 toward the left rear attachment part 34.

Consequently, the load F1 transferred from the left suspension arm 16 to the left front connecting part 63 can be satisfactorily (efficiently) transferred through the bottom part 53 of the body part 25 (specifically, the left side part 53c of the bottom part 53) to the left rear attachment part 34.

The load F1 transferred to the left front connecting part 63 can thereby be efficiently transferred through the left rear attachment part 34 to the rear frame attachment area 12b of the left side frame 12, and suitably borne by the vehicle body.

Figure 10:
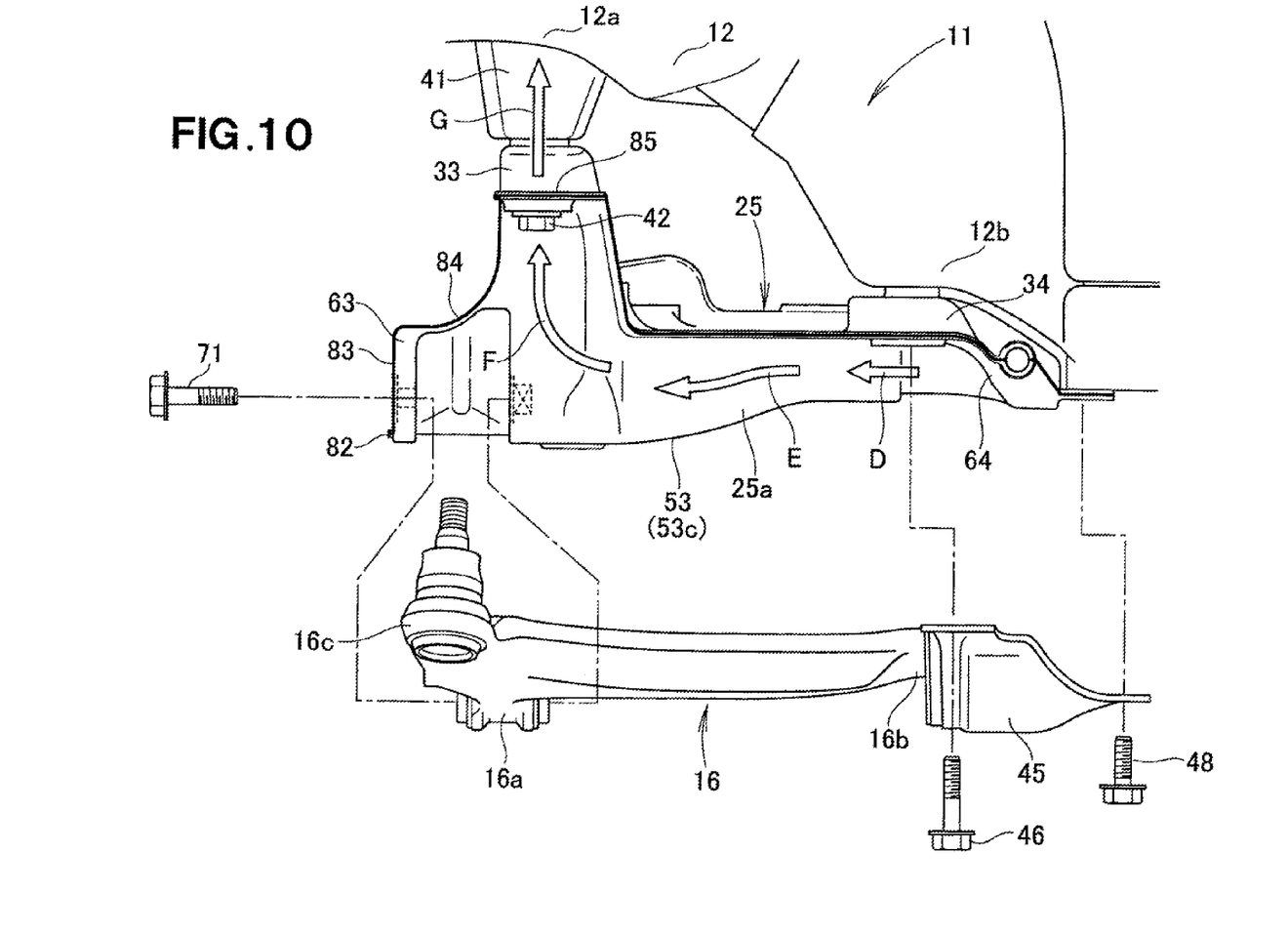
FIG. 10 illustrates an example in which a load is transmitted toward the front of the vehicle body from a rear attachment part of the left suspension arm to the subframe according to the present invention.

Next is a description, based on FIG. 10, of an example in which a load F2 is transferred from the rear attachment part 16b of the left suspension arm 16 to the left end part 25a of the body part 25.

As shown in FIG. 10, the remainder of the load inputted to the left suspension arm 16 from the distal end part 16c of the left suspension arm 16 is transferred to the left rear connecting part 64 as a load F2 through the rear attachment part 16b and the bolts 46, 48, as indicated by the arrow D.

The load F2 transferred to the left rear connecting part 64 is transferred toward the front of the vehicle body to the left end part 25a of the body part 25, as indicated by the arrow E. The load F2 transferred to the left end part 25a is transferred toward the left front attachment part 33 as indicated by the arrow F.

The load F2 transferred to the left front attachment part 33 is transferred through the left front attachment part 33, the bolt 42 and the left front leg part 41 to the front frame attachment area 12a of the left side frame 12, as indicated by the arrow G. The load F2 transferred to the front frame attachment area 12a is suitably borne by the left side frame 12 (i.e. the vehicle body 11).

Due to the load F2 being transferred as indicated by the arrows D to G, the first joining mark 82, the second joining mark 83, and the third joining mark 84 can be formed away from the direction in which the load F2 is transmitted.

The concentration of stress in the first through third joining marks 82 to 84 due to the inputted load F2 can thereby be minimized when the load F2 is inputted from the rear attachment part 16b of the left suspension arm 16 to the left rear connecting part 64, and the strength of the subframe 15 can be ensured.

The subframe 15 is also formed into a substantially curved shape so that the bottom part 53 of the body part 25 gradually rises from the left front connecting part 63 toward the left rear attachment part 34.

Consequently, the load F2 transferred from the left suspension arm 16 to the left rear connecting part 64 can be satisfactorily (efficiently) transferred through the bottom part 53 of the body part 25 (specifically, the left side part 53c of the bottom part 53) to the left front attachment part 33.

The load F2 transferred to the left rear connecting part 64 can thereby be efficiently transferred through the left front attachment part 33 to the front frame attachment area 12a of the left side frame 12, and suitably borne by the vehicle body.

The subframe of the vehicle according to the present invention is not limited to the embodiment previously described, and appropriate alterations, improvements, and the like can be made.

For example, in the previous embodiment, an example was described in which the present invention was applied to the subframe 15 included on the front part of the vehicle body 11, but this example is not provided by way of limitation to the present invention and can be applied to a subframe included on the rear part of the vehicle body 11.

In the previous embodiment, an example was described in which the front top inclined part 57 extends sloping upward from the front end 52*a* of the top part 52 to the middle 52*b*, but this example is not provided by way of limitation to the present invention; the front top inclined part 57 can be formed so as to extend from the front end 52*a* to the front side 52 or rear side of the middle 52*b*.

Furthermore, the shapes and configurations of the components such as the vehicle body front structure, the vehicle body, the subframe, the left and right suspension arms, the body part, the left and right suspension support parts, the left and right rear attachment parts, the front top inclined part, the left and right front connecting parts, the front connecting wall, and the parting line mark shown in the previous embodiment are not limited to those exemplified and can be altered as appropriate.

The present invention is suitable for application in an automobile including a subframe in which a body part having a hollow part is cast molded, and suspension support parts are provided to both the left and right end parts of the body part.

Obviously, various minor changes and modifications of the present invention are possible in light of the above teaching. It is therefore to be understood that within the scope of the appended claims the invention may be practiced otherwise than as specifically described.

What is claimed is:

1. A vehicle subframe comprising:
    a body part having an interior hollow part due to being cast molded; and
    left and right suspension support parts integrally provided to left and right end parts of the body part;
    suspension arms being connected to the suspension support parts once the subframe has been attached to a vehicle body,
    wherein the body part has in a top part thereof a front top inclined part extending to the rear of the vehicle body sloping upward from a front end of the top part,
    the suspension support parts have front connecting parts provided to the laterally outward sides of the front top inclined part and opened downward and laterally outward, whereby the suspension arms are connected from the laterally outward sides, and
    a parting line mark formed when the subframe is cast:
    is formed in a front part of the front connecting parts, in a bottom end part of the front connecting parts; and
    is formed in the laterally outward side parts of the front connecting parts, so as to extend upward from the bottom end part along the laterally outward side parts.

2. The vehicle subframe of claim 1, wherein an attachment part attached to the vehicle is provided to the rear of the front connecting parts in the vehicle body, and a bottom part of the body part is formed so as to gradually rise from the front connecting parts toward the attachment parts.

* * * * *